(12) United States Patent
Miller

(10) Patent No.: US 8,785,523 B2
(45) Date of Patent: *Jul. 22, 2014

(54) PHOSPHORUS LOADED PARTICLES AND METHODS FOR THEIR PREPARATION AND USE

(75) Inventor: Seth Adrian Miller, Englewood, CO (US)

(73) Assignee: Empire Technology Development, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,781

(22) Filed: Sep. 6, 2012

(65) Prior Publication Data

US 2013/0143021 A1 Jun. 6, 2013

Related U.S. Application Data

(63) Continuation of application No. 13/391,580, filed as application No. PCT/US2011/063509 on Dec. 6, 2011, now Pat. No. 8,288,455.

(51) Int. Cl.
*C08J 9/32* (2006.01)

(52) U.S. Cl.
USPC ............. 523/218; 524/80; 524/430; 524/450; 524/492; 524/493

(58) Field of Classification Search
USPC ............. 523/218; 524/80, 430, 450, 492, 493
See application file for complete search history.

(56) References Cited

U.S. PATENT DOCUMENTS

| 5,041,490 | A | 8/1991 | Sakon et al. |
| 5,292,494 | A | 3/1994 | Inao et al. |
| 5,409,976 | A | 4/1995 | Lindsay |
| 5,453,453 | A | 9/1995 | Lamon et al. |
| 6,133,358 | A | 10/2000 | Suzuki et al. |
| 6,645,625 | B2 | 11/2003 | Hoerold et al. |
| 6,846,854 | B2 | 1/2005 | Wagner et al. |
| 7,410,567 | B2 | 8/2008 | Lefenfeld et al. |
| 8,288,455 | B1 * | 10/2012 | Miller ........................ 523/218 |
| 2009/0048377 | A1 | 2/2009 | Kanno et al. |

FOREIGN PATENT DOCUMENTS

| EP | 2072566 | * | 4/2010 |
| EP | 2072566 | B1 | 4/2010 |
| JP | 600033206 | A | 2/1985 |
| JP | 2002256136 | A1 | 9/2002 |
| JP | 2003049036 | A1 | 2/2003 |

OTHER PUBLICATIONS

Pecht et al., "Electronic device encapsulation using red phosphorus flame retardants", Microelectronics Reliability 46 (2006) 53-62. Oct. 11, 2005.
Sorbead India, Static HTML page accessed Nov. 23, 2011. http://www.indiamart.com/sorbeadindia/chromatography—adsorbents.html.
Signa Chemistry, Static HTML page accessed Nov. 23, 2011. http://signachem.com/.
Cireli et al., "Development of Flame Retardancy Properties of New Halogen—Free Phosphorous Doped Si02 Thin Films on Fabrics", Journal of Applied Polymer Science, vol. 105 Issue 6, pp. 3748-3756, 2007.
Laoutid et al., "New prospects in flame retardant polymer materials: From fundamentals to nanocomposites", Materials Science and Engineering R: Reports vol. 63, Issue 3, 29, pp. 100-125, Jan. 2009.
PCT/US11/63509 International Search Report and Written Opinion mailed Jan. 27, 2012.

* cited by examiner

*Primary Examiner* — Edward Cain
(74) *Attorney, Agent, or Firm* — Turk IP Law, LLC

(57) ABSTRACT

A flame retardant additive includes red phosphorus adsorbed into a porous carrier. The carrier may be mixed with white phosphorus above its melting point (41° C.), so that liquid phosphorus is pulled into the pores of the carrier by capillary action. The phosphorus-loaded carrier may be heated above 250° C. to convert the white phosphorus to red phosphorus. The resulting red phosphorus-loaded carrier may retain flame retardant activity, and may also be protected from the environment for easier handling and formulation. By employing a carrier of a suitably small particle size, it is practical to incorporate the flame retardant red phosphorus-loaded carrier in thin films.

20 Claims, 12 Drawing Sheets

COMPUTER PROGRAM PRODUCT 800

SIGNAL-BEARING MEDIUM 802

804 AT LEAST ONE OF

ONE OR MORE INSTRUCTIONS FOR PROVIDING A NONCOMBUSTIBLE PARTICULATE THAT INCLUDES NANOSCALE PORES;

ONE OR MORE INSTRUCTIONS FOR PROVIDING A FLUID THAT INCLUDES PHOSPHORUS;

ONE OR MORE INSTRUCTIONS FOR CONTACTING THE FLUID THAT INCLUDES PHOSPHORUS TO THE NONCOMBUSTIBLE PARTICULATE;

ONE OR MORE INSTRUCTIONS FOR ADSORBING THE PHOSPHORUS FROM THE FLUID INTO THE NANOSCALE PORES OF THE NONCOMBUSTIBLE PARTICULATE TO PRODUCE THE FLAME RETARDANT COMPOSITION COMPRISING RED PHOSPHORUS ADSORBED BY THE NONCOMBUSTIBLE PARTICULATE;

ONE OR MORE INSTRUCTIONS FOR MELTING PHOSPHORUS TO FORM THE FLUID AS MOLTEN PHOSPHORUS;

ONE OR MORE INSTRUCTIONS FOR ADSORBING THE MOLTEN PHOSPHORUS INTO THE NANOSCALE PORES OF THE NONCOMBUSTIBLE PARTICULATE

ONE OR MORE INSTRUCTIONS FOR CONVERTING THE WHITE PHOSPHORUS TO RED PHOSPHORUS

ONE OR MORE INSTRUCTIONS FOR PROVIDING THE FLUID AS A SOLUTION;

ONE OR MORE INSTRUCTIONS FOR ADSORBING DISSOLVED PHOSPHORUS FROM THE SOLUTION OF PHOSPHORUS INTO THE NANOSCALE PORES OF THE NONCOMBUSTIBLE PARTICULATE;

ONE OR MORE INSTRUCTIONS FOR REMOVING THE SOLVENT TO FORM THE FLAME RETARDANT COMPOSITION

| COMPUTER-READABLE MEDIUM 806 | RECORDABLE MEDIUM 808 | COMMUNICATIONS MEDIUM 810 |

FIG. 8A

COMPUTER PROGRAM PRODUCT 800

SIGNAL-BEARING MEDIUM 802

805 AT LEAST ONE OF

ONE OR MORE INSTRUCTIONS FOR PROVIDING A POLYMER;

ONE OR MORE INSTRUCTIONS FOR PROVIDING A FLAME RETARDANT THAT INCLUDES A NONCOMBUSTIBLE PARTICULATE THAT INCLUDES NANOSCALE PORES; AND RED PHOSPHORUS ADSORBED INTO THE NANOSCALE PORES OF THE NONCOMBUSTIBLE PARTICULATE; AND

ONE OR MORE INSTRUCTIONS FOR CONTACTING THE POLYMER AND THE FLAME RETARDANT TO FORM THE POLYMER COMPOSITION.

ONE OR MORE INSTRUCTIONS FOR PROVIDING AN ORGANIC SOLVENT SOLUTION OF THE POLYMER; AND CONTACTING THE ORGANIC SOLVENT SOLUTION OF THE POLYMER AND THE FLAME RETARDANT AND REMOVING THE ORGANIC SOLVENT TO FORM THE POLYMER COMPOSITION;

ONE OR MORE INSTRUCTIONS FOR PROVIDING A MONOMER OF THE POLYMER; CONTACTING THE MONOMER AND THE FLAME RETARDANT; AND POLYMERIZING THE MONOMER TO FORM THE POLYMER IN CONTACT WITH THE FLAME RETARDANT;

ONE OR MORE INSTRUCTIONS FOR PROVIDING THE POLYMER IN MOLTEN FORM; MIXING THE POLYMER IN MOLTEN FORM WITH THE FLAME RETARDANT; AND COOLING THE POLYMER IN MOLTEN FORM WITH THE FLAME RETARDANT TO FORM THE FLAME RETARDANT POLYMER COMPOSITION;

ONE OR MORE INSTRUCTIONS FOR FORMING THE POLYMER AS A FILM THAT INCLUDES THE FLAME RETARDANT;

| COMPUTER-READABLE MEDIUM 806 | RECORDABLE MEDIUM 808 | COMMUNICATIONS MEDIUM 810 |

FIG. 8B

PHOSPHORUS LOADED PARTICLES AND METHODS FOR THEIR PREPARATION AND USE

RELATED APPLICATIONS

This application is a continuation of co-pending U.S. patent application Ser. No. 13/391,580 filed on Feb. 21, 2012 by the same inventors, commonly assigned herewith.

This utility patent application claims the benefit of International Patent Application Serial Number PCT/US11/63509 filed on Dec. 6, 2011 by the same inventors, commonly assigned herewith.

BACKGROUND

Unless otherwise indicated herein, the materials described in this section are not prior art to the claims in this application and are not admitted to be prior art by inclusion in this section.

Phosphorus and phosphorus compounds have several characteristics that provide flame retardant properties: a high radical quenching ability, which may limit the chemistry that propagates a flame; and char combustion products that may form a char layer, which physically covers the underlying material and protects it from burning.

Adding more phosphorus to a polymer improves flame retardancy, because it increases the eventual thickness of the phosphate char layer that results when the phosphorus is combusted. A concentrated form of phosphorus is red phosphorus, but it may be challenging to form into a granular powder for mixing with polymers, and it may release toxic phosphine gas upon contact with moisture. For example, phosphorus has been employed in a two component mixture with silica gel and found to have flame retardant activity. However, such mixtures may be challenging to form free-flowing granular powders suitable for handling, and may still be susceptible to contact with moisture.

It would be desirable to make thin polymer coatings using red phosphorus as a char former, since such films would be very efficient at preventing the underlying polymer from combusting. However, phosphorus particle average diameters are typically >100 micrometers, which may limit polymer film thickness, since such particles will stick out of films thinner than the particle size. Such particles may also be exposed at the surface of thicker polymer articles. Such exposed particles are undesirable since they may react with water to form toxic phosphine gas, in addition to other potentially negative functional and cosmetic effects on the polymer article. The two component phosphorus mixture with silica gel may be unsuited to polymer thin films and polymer surfaces because the phosphorus may still include typical particle average diameters >100 micrometers.

The present disclosure appreciates that incorporating phosphorus as a flame retardant into polymers, particularly thin polymer films, may be a challenging endeavor.

SUMMARY

The present disclosure generally describes compositions and methods for flame retardant compositions employing phosphorus.

According to some examples, a flame retardant composition is provided. The flame retardant composition may include a noncombustible particulate that includes nanoscale pores; and red phosphorus adsorbed into the nanoscale pores of the noncombustible particulate.

According to other examples, a flame retardant polymer composition is provided. The flame retardant polymer composition may include at least one polymer, and a flame retardant composition dispersed in the polymer. The flame retardant composition may include a noncombustible particulate that includes nanoscale pores; and red phosphorus adsorbed into the nanoscale pores of the noncombustible particulate.

According to further examples, a method of making a flame retardant composition is provided. The method of making a flame retardant composition may include: providing a noncombustible particulate that includes nanoscale pores; providing a fluid that includes phosphorus; contacting the fluid and the noncombustible particulate; and adsorbing the phosphorus from the fluid into the nanoscale pores of the noncombustible particulate to produce the flame retardant composition comprising solid red phosphorus adsorbed by the noncombustible particulate.

According to yet other examples, a method of making a flame retardant polymer composition is provided. The method of making the flame retardant polymer composition may include: providing a polymer; providing a flame retardant that includes a noncombustible particulate that includes nanoscale pores, and red phosphorus adsorbed into the nanoscale pores of the noncombustible particulate; and contacting the polymer and the flame retardant to form the polymer composition.

According to some examples, a computer-readable storage medium having instructions stored thereon for making a flame retardant composition is provided. The instructions may include: providing a noncombustible particulate that includes nanoscale pores; providing a fluid that includes phosphorus; contacting the fluid that includes phosphorus and the noncombustible particulate; and adsorbing the phosphorus from the fluid into the nanoscale pores of the noncombustible particulate to produce the flame retardant composition comprising red phosphorus adsorbed by the noncombustible particulate.

According to other examples, a system for preparing a flame retardant composition is provided. The system for preparing a flame retardant composition may include: a mixing chamber configured to mix solids and liquids; a phosphorus source; a particulate source; a heater; and a solvent source.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8A illustrates a block diagram of an example computer program product that may be used to control the automated machine of FIG. 6 or similar manufacturing equipment in making the example flame retardant compositions;

FIG. 8B illustrates a block diagram of an example computer program product that may be used to control the automated machine of FIG. 6 or similar manufacturing equipment in making the example flame retardant polymer compositions; all arranged in accordance with at least some embodiments described herein.

DETAILED DESCRIPTION

Figure 1A:
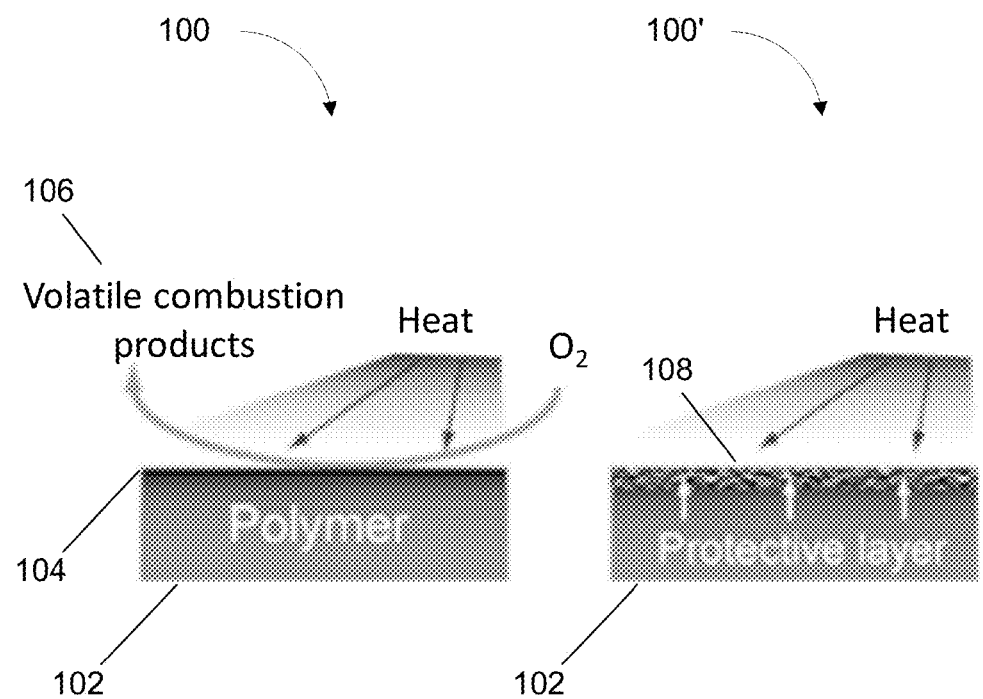
FIG. 1A illustrates the formation of a protective char layer on a polymer surface.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to compositions, methods, apparatus, systems, devices, and/or computer program products related to phosphorus flame retardant additives.

Briefly stated, a flame retardant additive includes red phosphorus adsorbed into a noncombustible particulate. The particulate may be mixed with a fluid that includes phosphorus. For example, molten white phosphorus above its melting point (~44° C.) may be contacted to the particulate and may enter into the pores of the particulate by capillary action. The white phosphorus-loaded particulate may be heated above 250° C. to convert the white phosphorus to red phosphorus. The resulting red phosphorus-loaded carrier may retain flame retardant activity, and may also be protected from the environment for easier handling and formulation. By employing a particulate of a suitably small particle size, it is practical to incorporate the flame retardant red phosphorus-loaded carrier in thin polymer films.

FIG. 1A illustrates a polymer composite 100, including a substrate polymer 102 which may be coated with a flame retardant layer 104. Heat and oxygen may react with the flame retardant layer 104 to form a protective char layer 108, which may protect the substrate polymer from at least some further flame damage.

Figure 1B:
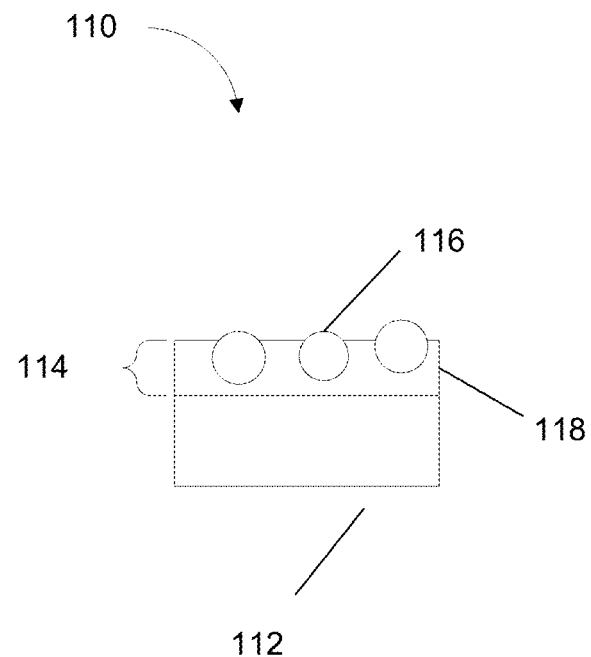
FIG. 1B illustrates a polymer composite which includes a substrate polymer, and a flame retardant layer that includes a polymer film and a collection of red phosphorus particles.

FIG. 1B illustrates a polymer composite 110 which includes a substrate polymer 112, and a flame retardant layer 114 that includes a polymer film 118 and a collection of red phosphorus particles 116. For many applications, it may be desirable to have a smooth surface to the flame retardant layer 114. Moreover, in many applications it may be desirable to have the red phosphorus particles 116 located within the polymer film 118 to reduce or avoid reaction between the red phosphorus particles 116 and species in the environment, for example, water. However, it is known that stable red phosphorus particles may be prepared with average particle diameters in the range of 100 micrometers or larger. If the flame retardant layer 114 is to have a smooth surface, the thickness of the polymer film 118 may be greater than a diameter of the red phosphorus particles 116.

Figure 2:
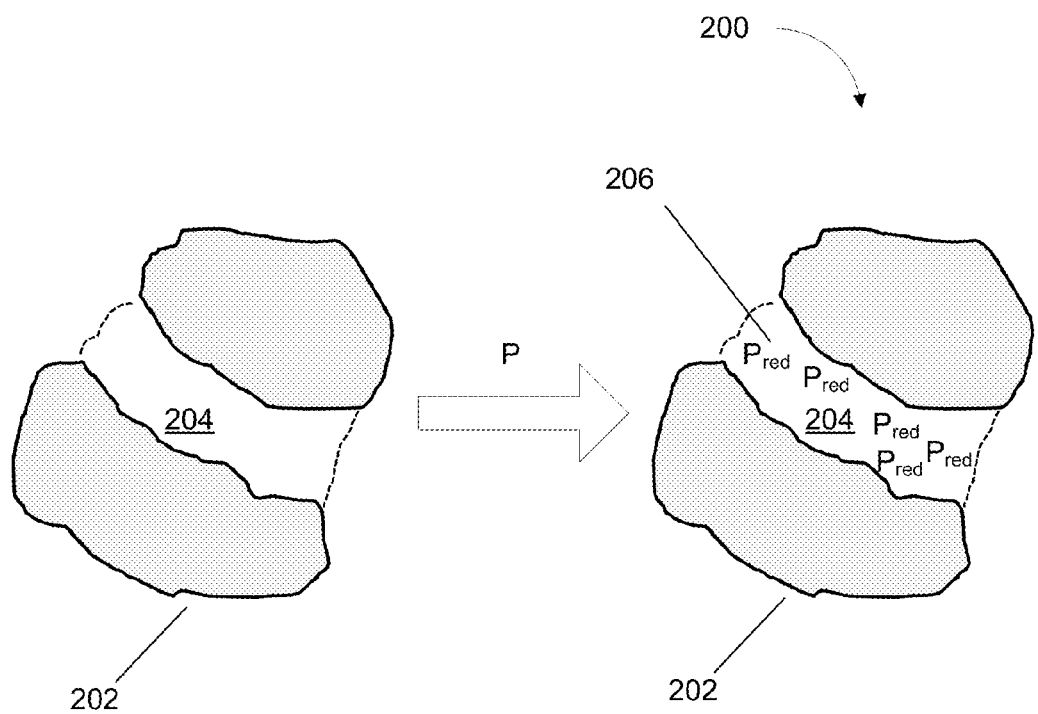
FIG. 2 illustrates a noncombustible particulate which may have one or more nanopores. The noncombustible particulate may be loaded with red phosphorus to form a flame retardant composition.

FIG. 2 illustrates a noncombustible particulate 202 which may have one or more nanopores 204. The noncombustible particulate 202 may be loaded with red phosphorus 206 to form flame retardant composition 200.

As used herein, a "noncombustible particulate" is a collection of particles comprising a substance that does not burn in an oxygen atmosphere. In various examples, suitable noncombustible particulates may include particles of silica gel, alumina, a zeolite, and/or an aerogel. The noncombustible particulate may be prepared beforehand by holding under vacuum and/or heating, e.g., silica gel may be calcined.

The noncombustible particulate 202 may be characterized by an average diameter less than about 100 micrometers, or in some examples, an average diameter in micrometers of about 75, about 60, about 50, about 40, about 30, about 25, about 20, about 15, about 10, about 5, about 2.5, or about 1. In various examples, the average particle diameter of the noncombustible particulate may be in a range between any two of the values in the preceding sentence, e.g., between about 0.1 micrometers and about 100 micrometers.

The noncombustible particulate 202 may be characterized by nanopores 204 having an average diameter less than the average diameter of the noncombustible particulate 202. In various examples, the average diameter of the nanopores 204 in the noncombustible particulate 202 may be, in micrometers, about 10, about 8, about 6, about 4, about 2, about 1, about 0.8, about 0.6, about 0.4, about 0.2, about 0.1, about 0.08, about 0.06, about 0.04, about 0.02, about 0.01, about 0.008, about 0.006, about 0.004, about 0.002, or about 0.001. In various examples, the average nanopore diameter of the noncombustible particulate 202 may be in a range between any two of the values in the preceding sentence, e.g., between about 0.001 micrometers and about 10 micrometers.

The noncombustible particulate 202 may be characterized by a surface area per weight value, e.g., as measured by gas sorption. In various examples, the surface area per weight value of the noncombustible particulate 202 in square meters per gram may be at least: about 20, about 50, about 100, about 250, about 500, about 750, about 1,000, about 1,500, or about 2,000. In various examples, the surface area per weight value of the noncombustible particulate 202 in square meters per gram may be in a range between any two of the values in the preceding sentence, e.g., between about 20 square meters per gram and about 2,000 square meters per gram.

The noncombustible particulate 202 may be characterized by a relative density as compared to a nonporous solid made of the same material, characterized as a percentage. In various examples, the relative density of the noncombustible particulate be: about 90%, about 80%, about 70%, about 60%, about 50%, about 40%, about 30%, about 20%, about 10%, about 6%, about 4%, about 2%, about 2%, about 1%, about 0.5%, about 0.1%, or about 0.05%. In various examples, the relative density of the noncombustible particulate 202 may be in a range between any two of the values in the preceding sentence, e.g., between about 50% and about 1%.

Flame retardant composition 200 may be formed by any suitable process which results in the red phosphorus 206 in the nanopores 204 of the noncombustible particulate 202. In various examples, white phosphorus may be introduced into the nanopores 204 of the noncombustible particulate 202, where the white phosphorus may be converted in situ to the red phosphorus 206. In some examples, a combination of white and red phosphorus may be introduced into the nanopores 204 of the noncombustible particulate 202, where the white phosphorus may be converted in situ to the red phosphorus 206. In some other examples, red phosphorus 206 may be introduced directly in the nanopores 204 of the noncombustible particulate 202.

Figure 3:
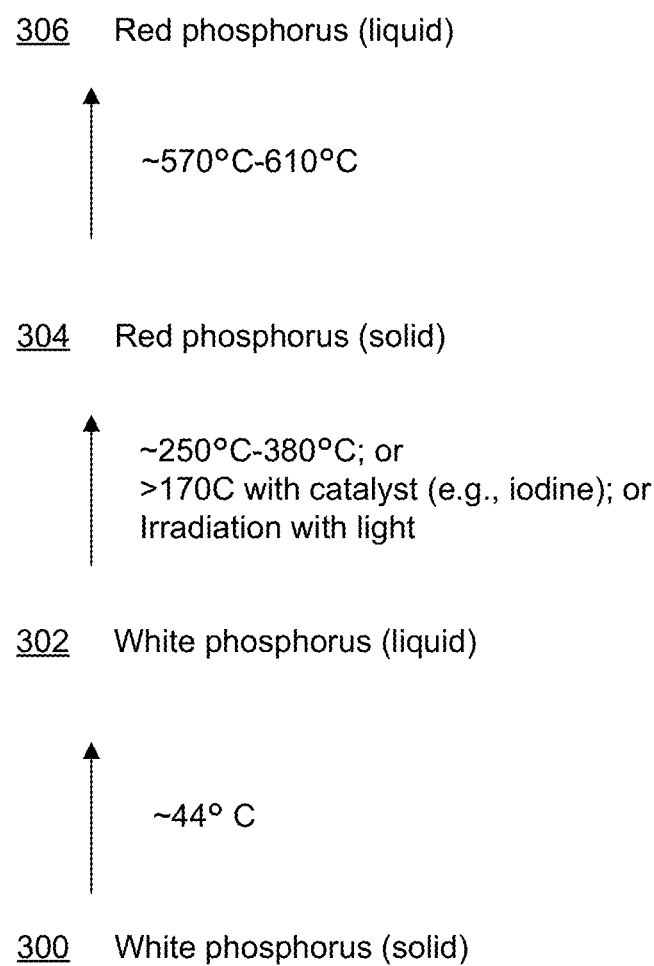
FIG. 3 illustrates various conditions for processing red and white phosphorus.

For example, a fluid that includes phosphorus may be prepared and contacted to noncombustible particulate 202. A fluid that includes phosphorus may be represented by molten phosphorus, e.g., molten red phosphorus or molten white phosphorus. A fluid that includes phosphorus may be represented by phosphorus vapor, e.g., phosphorus vapor distilled from precipitated phosphates. FIG. 3 illustrates various conditions for processing red and white phosphorus. For example, under 1 atmosphere of pressure, white phosphorus melts at about 44° C. Molten white phosphorus may move into the nanopores 204 of the noncombustible particulate 202, e.g., via capillary action, diffusion, fluid transport, or the like. In a further example, white phosphorus may be converted to a vapor by heating under reduced pressure and allowing the phosphorus vapor to condense in the nanopores 204 of the noncombustible particulate 202.

In other examples, white phosphorus may be dissolved in a solvent and contacted to the noncombustible particulate 202. Dissolved white phosphorus may move into the nanopores 204 of the noncombustible particulate 202, e.g., via capillary action, diffusion, fluid transport, or the like. The solvent may then be removed. Suitable solvents for dissolving white phosphorus include carbon disulfide, liquid ammonia, liquid sulfur dioxide, liquid carbon dioxide, phosphorus tribromide, or the like. Suitable solvents for white phosphorus may also include organic solvents such as acetone, methyl ethyl ketone, diethyl ether, carbon tetrachloride, trichloroethylene, hexane, cyclohexane, decane, benzene, toluene, ethylene bromide, chlorobenzene, p-dibromobenzene, or the like.

In some examples, red phosphorus 206 may be introduced directly in the nanopores 204 of the noncombustible particulate 202. For example, red phosphorus may be dissolved in a solvent and contacted to the noncombustible particulate 202. Dissolved red phosphorus may move into the nanopores 204 of the noncombustible particulate 202, e.g., via capillary action, diffusion, fluid transport, or the like. The solvent may then be removed. Suitable solvents for dissolving red phosphorus include phosphorus trichloride, phosphorus tribromide, and the like. In some examples, red phosphorus may be melted and contacted to the noncombustible particulate 202, and may be drawn into the nanopores 204 via capillary action, diffusion, or the like.

When phosphorus is added to the nanopores 204 of the noncombustible particulate 202, some portion of the phosphorus may be in the form of white phosphorus. In various examples, white phosphorus may be converted to red phosphorus in situ in the nanopores 204 of the noncombustible particulate 202.

FIG. 3 illustrates various temperatures for converting white phosphorus to red phosphorus. As shown in the figure, white phosphorus is in solid form (300) generally up to about 44° C., where it starts to liquefy (302). White phosphorus may be converted to solid red phosphorus (304) between about 250° C. and about 380° C. over a period of minutes to hours. Red phosphorus converts to liquid form between about 306° C. and about 583° C.

These temperatures are approximate and may vary depending on the purity of the phosphorus. Further, for example, a catalyst or solvent may be employed to facilitate the conversion. Iodine or bromine may be employed as catalysts for converting white phosphorus to red phosphorus, e.g., at a temperature of about 170° C. In other examples, white phosphorus may be converted to red phosphorus in the presence of phosphorus trichloride, phosphorus tribromide, or phosphorus triiodide at a temperature of about 170° C. In some examples, white phosphorus may be converted to red phosphorus in situ in the nanopores by irradiating with ultraviolet and/or visible light, e.g., sunlight, for minutes to hours, depending on the amount of white phosphorus to be converted to red phosphorus. In various examples, white phosphorus may remain in the nanopores of the noncombustible particulate after thermal or photo operations to convert white phosphorus to red phosphorus.

Figure 4A:
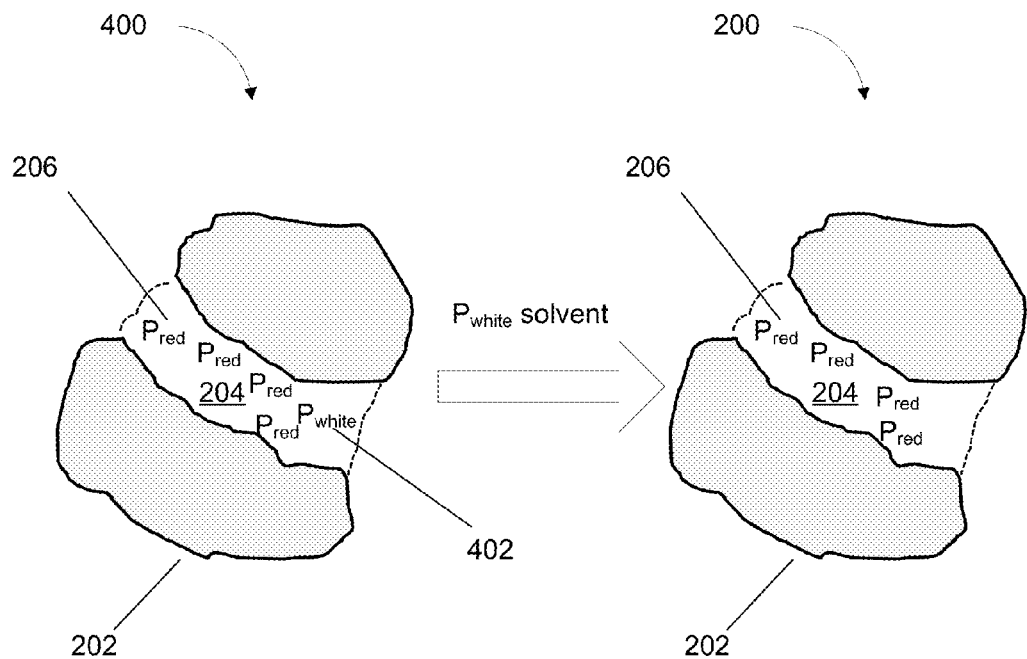
FIG. 4A illustrates separation of white phosphorus from the example flame retardant composition.

FIG. 4A illustrates that white phosphorus 402 may be extracted using a solvent that selectively dissolves white phosphorus in the presence of red phosphorus 206, for example, carbon disulfide, liquid ammonia, liquid sulfur dioxide, liquid carbon dioxide, or the like. Suitable solvents for white phosphorus 402 may also include organic solvents such as acetone, methyl ethyl ketone, diethyl ether, carbon tetrachloride, trichloroethylene, hexane, cyclohexane, decane, benzene, toluene, ethylene bromide, chlorobenzene, p-dibromobenzene, or the like.

In some examples, red and/or white phosphorus may remain which is not adsorbed by the noncombustible particulate. Particulate separation techniques such as sizing, cyclonic particle separation, electrostatics, or the like may be employed to separate any unadsorbed red and/or white phosphorus particles from the noncombustible particulate.

In various examples, the flame retardant composition 200 may be characterized by a total red phosphorus content comprised substantially of the adsorbed red phosphorus 206. As used herein, "total red phosphorus content" means all the phosphorus in the flame retardant composition. The adsorbed red phosphorus may be characterized as a percentage of the total red phosphorus content, in various examples being at least about 50%, about 60%, about 70%, about 80%, about 90%, about 95%, about 98%, or about 99%.

In various examples, the flame retardant composition 200 may be characterized by a red phosphorus percentage by weight of the flame retardant composition. The red phosphorus percentage by weight may be at least about 30%, about 40%, about 50%, about 60%, about 70%, about 80%, about 90%, about 95%, about 98%, or about 99%. In various examples, the red phosphorus percentage by weight of the flame retardant composition may be in a range between any two of the values in the preceding sentence, e.g., between about 30% and about 90%.

In various examples, the flame retardant composition 200 may be characterized by comparing a rate of reaction between water and the adsorbed red phosphorus 206 and a rate of reaction of water with pure red phosphorus. For example, the flame retardant composition 200 may be characterized by a reaction rate at 25° C. between water and the red phosphorus adsorbed by the noncombustible particulate; this reaction rate may be less than a reaction rate at 25° C. between water and a pure red phosphorus particulate having an average particle diameter of 100 micrometers.

Figure 4B:
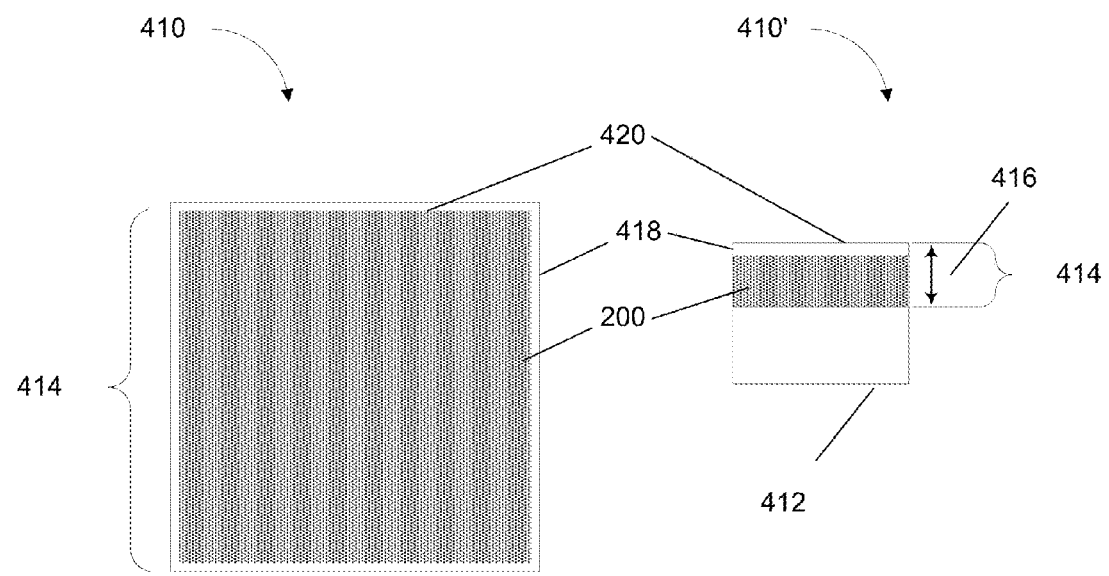
FIG. 4B illustrates polymer articles, each including a flame retardant polymer composition.

FIG. 4B illustrates a polymer article 410 and a polymer article 410', each including a flame retardant polymer composition 414 that includes flame retardant composition particles 200 dispersed in a polymer 418. In article 410, the flame retardant polymer composition 414 and the polymer 418 are depicted in the form of a large macroscopic polymer article. In article 410', the flame retardant polymer composition 414 and the polymer 418 are depicted in the form of a thin film that contacts a substrate polymer 412. Since flame retardant composition particles 200 are small in diameter, it is possible to have a smooth surface 420 at polymer 418, particularly in composition 410', where polymer 418 is in the form of a thin film.

In article 410', flame retardant polymer composition 414 may be characterized by an average film thickness 416 in micrometers that may be less than about 100, 90, 80, 70, 60, 50, 40, 30, 20 or 10. In various examples, the average film thickness 416 may be in a range between any two of the values in the preceding sentence, e.g., between about 10 micrometers and about 100 micrometers. In various examples, the average film thickness 416 may be greater than the average diameter of the flame retardant composition particles 200. The average film thickness 416 may permit the flame retardant composition particles 200 to lie below the surface 420 of the polymer 418, which may also permit the surface 420 to be smooth.

In some examples, the red phosphorus adsorbed by the noncombustible particulate 202 in flame retardant composition particles 200 may be characterized by a weight percentage compared to the total weight of the flame retardant polymer composition 414. For example, the red phosphorus weight percentage compared to the total weight of the flame retardant polymer composition 414 may be at least: about 0.1%, about 1%, about 5%, about 10%, about 15%, about 20%, or about 25%. In various examples, the red phosphorus weight percentage compared to the flame retardant polymer composition 414 may be in a range between any two of the values in the preceding sentence, e.g., between about 0.1% and about 25%.

In various examples, the polymer 418 includes one or more of a polyolefin, a polyalkylene, a polyoxyalkylene, a polyvinylene, a polyarylene, a polyheteroarylene, a polyester, a polyalkylene terephthalate, a polyacrylonitrile, a polyacrylate, a polystyrene, a poly acrylonitrile-butadiene-polystyrene, a polycarbonate, a polyether, a polyurethane, an epoxy, mixtures thereof, and copolymers thereof.

Example embodiments may also include methods of making the flame retardant composition 200 and the flame retardant polymer composition 414 as described herein. These methods may be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each may be only with a machine that performs a portion of the program. In other examples, the human interaction may be automated such as by pre-selected criteria that are machine automated.

Example embodiments may also include methods. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 5A:
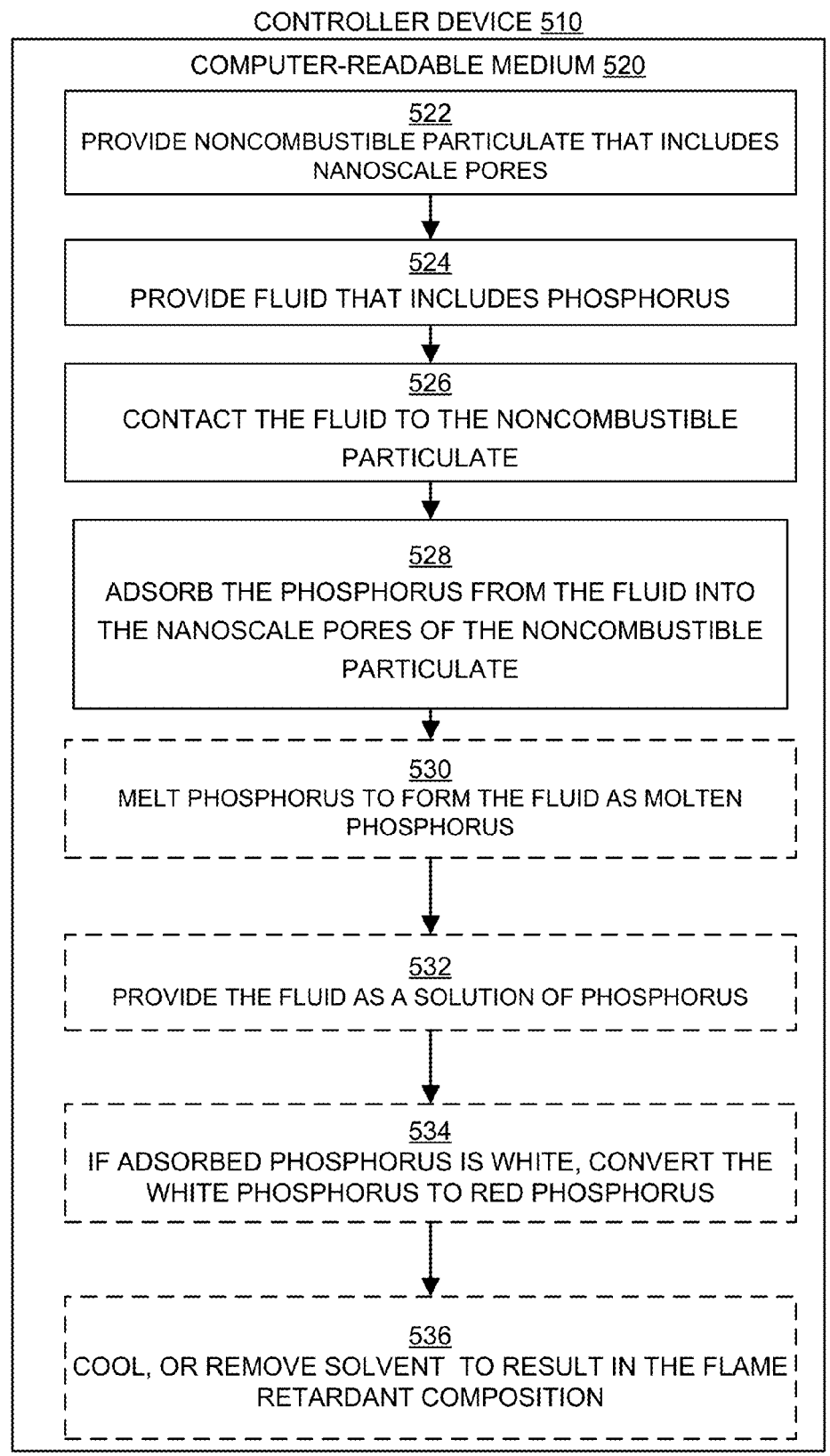
FIG. 5A is a flow diagram showing operations that may be used in making the example flame retardant composition.
Figure 5B:
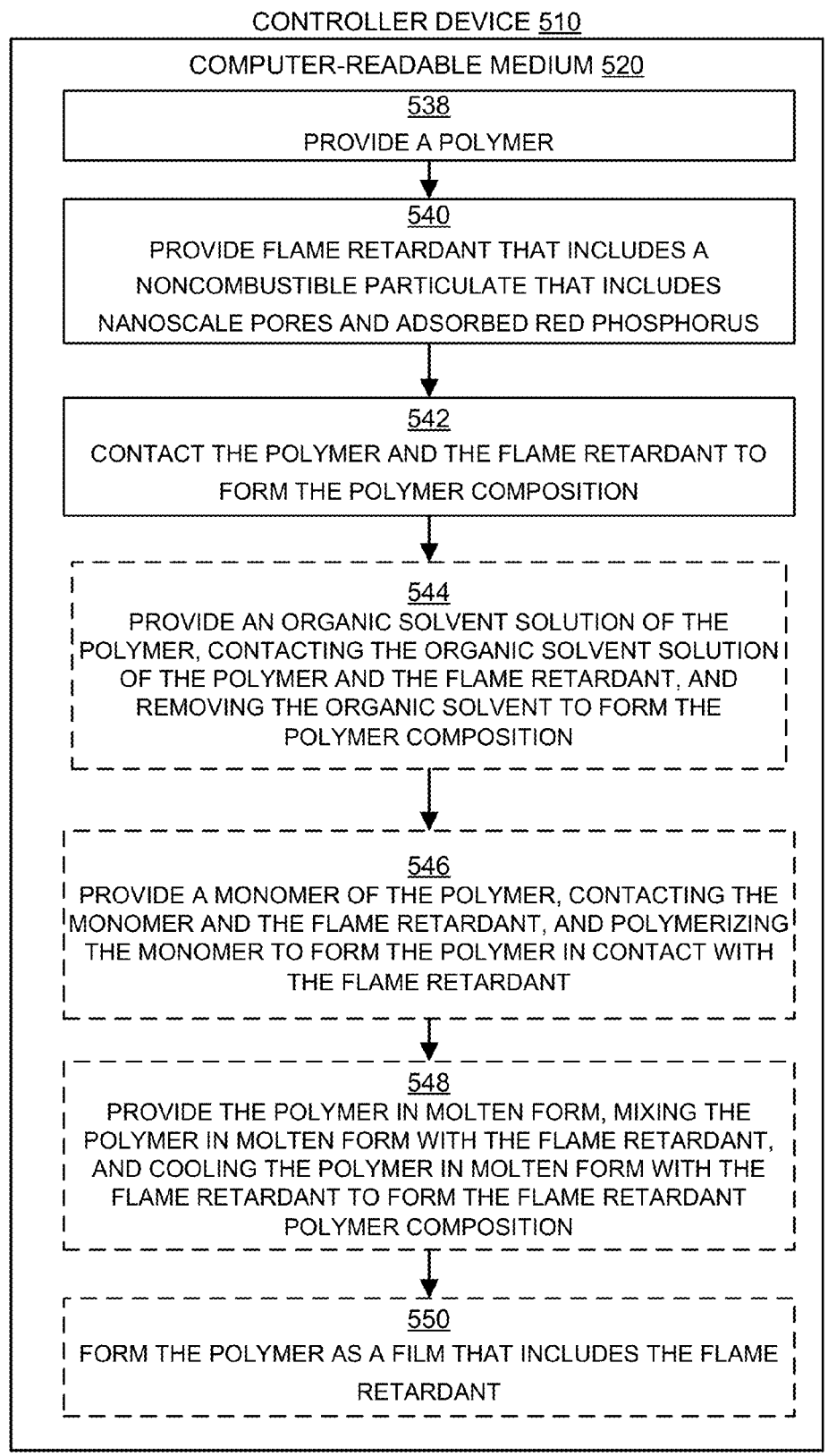
FIG. 5B is a flow diagram showing operations that may be used in making the example flame retardant polymer composition.

FIG. 5A is a flow diagram illustrating an example method for forming a flame retardant composition, in accordance with at least some embodiments described herein. FIG. 5B is a flow diagram illustrating an example method for forming a flame retardant polymer composition in accordance with at least some embodiments described herein. The actions in FIG. 5A and FIG. 5B may be performed by a manufacturing system such as system 600 in FIG. 6 and controlled by a computing device such as device 700 in FIG. 7, in accordance with at least some embodiments described herein. Example methods may include one or more operations, functions or actions as illustrated by one or more of blocks 522, 524, 526, 528, 530, 532, 534, 536, 538, 540, 542, 544, 546, 548, and/or 550. The operations described in the blocks 522 through 550 may also be stored as computer-executable instructions in a computer-readable medium such as a computer-readable medium 520 of a computing device 510.

Figure 6:
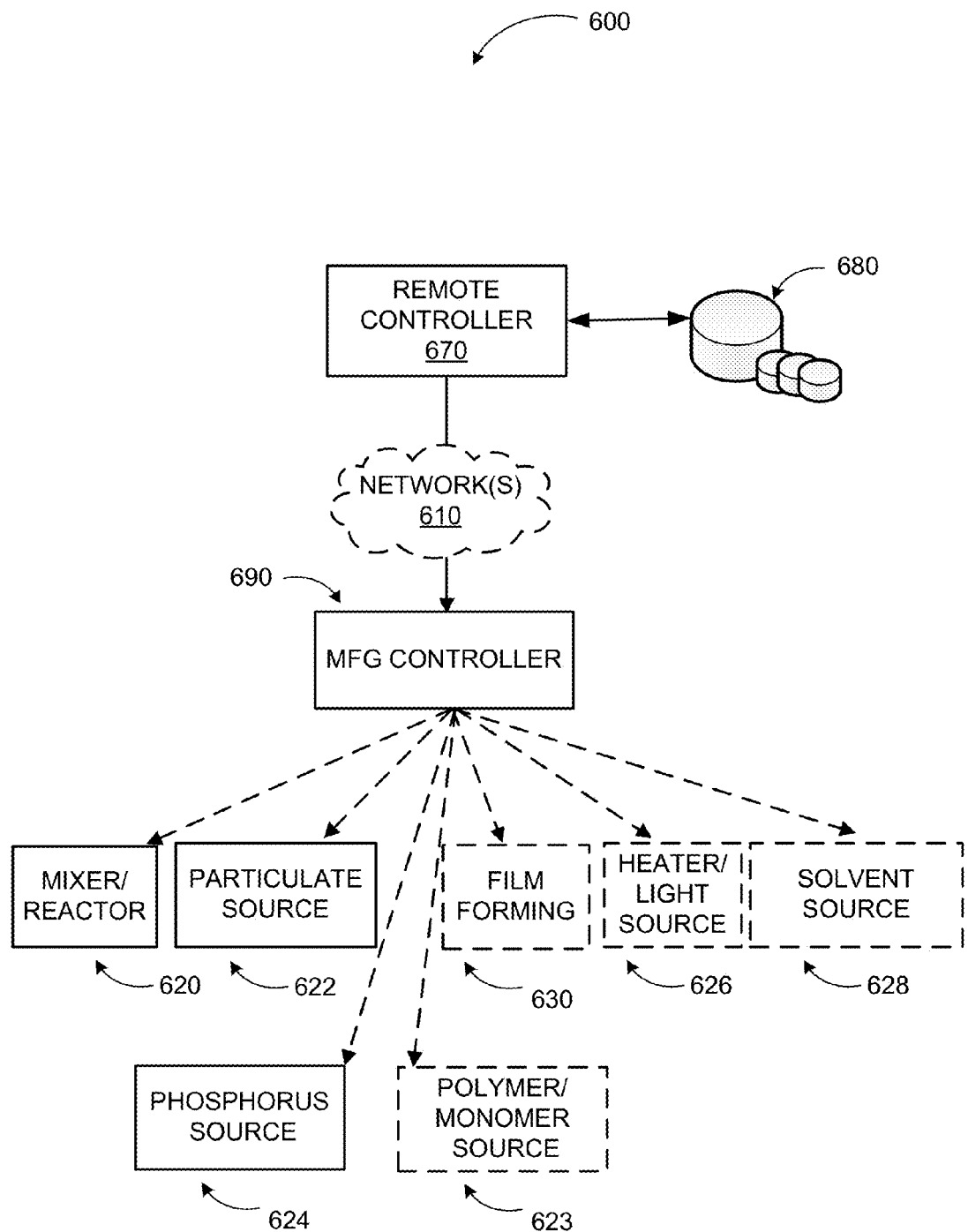
FIG. 6 is a block diagram of an automated machine 600 that may be employed for making the example flame retardant compositions and flame retardant polymer compositions.

An example process of making a flame retardant composition such as flame retardant composition 200 may begin in FIG. 5A with block 522, "PROVIDE NONCOMBUSTIBLE PARTICULATE THAT INCLUDES NANOSCALE PORES," e.g., noncombustible particulate 202 with nanopores 204 as depicted in FIG. 2, provided from particulate source 622 in FIG. 6.

Referring again to FIG. 5A, block 522 may be followed by block 524, "PROVIDE FLUID THAT INCLUDES PHOSPHORUS," e.g., from phosphorus fluid source 624. Block 524 may be followed by block 526, "CONTACT THE FLUID TO THE NONCOMBUSTIBLE PARTICULATE," and block 528, "ADSORB THE PHOSPHORUS FROM THE FLUID INTO THE NANOSCALE PORES OF THE NONCOMBUSTIBLE PARTICULATE," which may be conducted in mixer/reactor/absorber chamber 620.

In some examples, the fluid that includes phosphorus in block 524 may be created in optional block 530, "MELT PHOSPHORUS TO FORM THE FLUID AS MOLTEN PHOSPHORUS," e.g., by employing heater 626 for melting white phosphorus above about 44° C. or melting red phosphorus above about 570° C., for example as described in FIG. 3.

In other examples, the fluid that includes phosphorus may be created in optional block 532, "PROVIDE THE FLUID AS A SOLUTION OF PHOSPHORUS," e.g., a solution of white phosphorus in carbon disulfide, liquid ammonia, liquid sulfur dioxide, liquid carbon dioxide, phosphorus tribromide, or organic solvents; or, e.g., a solution of red phosphorus in phosphorus trichloride, phosphorus tribromide, or the like. Block 532 may be accomplished using phosphorus source 624, solvent source 628, and mixer/reactor 620.

In some examples, optional block 534 may be included, "IF ADSORBED PHOSPHORUS IS WHITE, CONVERT THE WHITE PHOSPHORUS TO RED PHOSPHORUS." For example, as depicted in FIG. 3, white phosphorus may be converted to red phosphorus by heating the white phosphorus to a temperature greater than about 250° C.; heating the white phosphorus to a temperature greater than about 170° C. in the presence of phosphorus trichloride, phosphorus tribromide, phosphorus triiodide, bromine, or iodine; exposing the white phosphorus to light; or the like. Block 534 may be accomplished using heater/light source 626.

Some examples may include optional block 536, "COOL, OR REMOVE SOLVENT TO RESULT IN THE FLAME RETARDANT COMPOSITION," e.g., using heater 626.

An example process of making a flame retardant polymer composition such as flame retardant polymer composition 414 may begin in FIG. 5B with block 538, "PROVIDE A POLYMER," e.g., polymer 418 as depicted in FIG. 4B using polymer source 624. Block 538 may be followed by block 540, "PROVIDE FLAME RETARDANT THAT INCLUDES A NONCOMBUSTIBLE PARTICULATE THAT INCLUDES NANOSCALE PORES AND ADSORBED RED PHOSPHORUS," e.g., flame retardant composition 200 as depicted in FIG. 2 and FIG. 4B. Block 540 may be followed by block 542, "CONTACT THE POLYMER AND THE FLAME RETARDANT TO FORM THE POLYMER COMPOSITION," e.g., using mixing/reactor chamber 620.

In some examples, optional block 544 may be included, "PROVIDE AN ORGANIC SOLVENT SOLUTION OF THE POLYMER, CONTACTING THE ORGANIC SOLVENT SOLUTION OF THE POLYMER AND THE FLAME RETARDANT, AND REMOVING THE ORGANIC SOLVENT TO FORM THE POLYMER COMPOSITION." Block 544 may be accomplished using one or more of polymer source 623, solvent source 628, and mixer/reactor 620.

In some examples, optional block 546 may be included, "PROVIDE A MONOMER OF THE POLYMER, CONTACTING THE MONOMER AND THE FLAME RETARDANT, AND POLYMERIZING THE MONOMER TO FORM THE POLYMER IN CONTACT WITH THE FLAME RETARDANT." Block 546 may be accomplished using one or more of monomer source 623, heater/light source 626, solvent source 628, and mixer/reactor 620.

In some examples, optional block 548 may be included, "PROVIDE THE POLYMER IN MOLTEN FORM, MIXING THE POLYMER IN MOLTEN FORM WITH THE FLAME RETARDANT, AND COOLING THE POLYMER IN MOLTEN FORM WITH THE FLAME RETARDANT TO FORM THE FLAME RETARDANT POLYMER COMPOSITION." Block 548 may be accomplished using one or more of polymer source 623, heater 626, and mixer/reactor 620.

In some examples, optional block 550 may be included, "FORM THE POLYMER AS A FILM THAT INCLUDES THE FLAME RETARDANT," e.g., film 414 in article 410' as depicted in FIG. 4B. Block 550 may be accomplished using one or more of mixer/reactor 620, polymer source 624, heater 626, solvent source 628, and film forming/coating apparatus 630. Suitable polymer processing methods for forming the flame retardant polymer compositions in films, coatings, or other forms include any suitable methods for forming the polymer in question in the absence of the flame retardant composition. Such methods may include one or more techniques such as: melt processing; solvent evaporation; reduced pressure solvent evaporation; spin coating; dip coating; spray coating; solvent casting; doctor blading; removal of solvent under supercritical conditions; polymerization in situ from precursors of the polymer; curing or crosslinking the polymer in situ; or the like. Specific details of suitable polymer processing conditions may be selected based on the particular polymer chosen to make the flame retardant polymer composition. For example, a solution casting method may employ high boiling solvents of the polymer in question. One additional consideration for making the flame retardant polymer composition may include various mixing techniques for dispersing the flame retardant composition particles in the polymer. The flame retardant composition particles may be dispersed in a solution or liquid of the polymer or a polymer precursor. The dispersal methods may include mechanical techniques, for example, stirring or mechanical ball milling the flame retardant composition particles in combination with the polymer. The dispersal methods may also include, for example, ultrasonication of the nanoparticles in contact with the polymer. In various examples, the dispersal method (e.g., ultrasonication) is followed immediately by the polymer forming method (e.g., spin coating) to avoid settling of the dispersed particles. The flame retardant composition particles may be aided in dispersal by providing an organic surface layer coating. The organic surface layer coating may improve interactions between the nanoparticles and the polymer to permit better dispersal of the nanoparticles in the polymer. The noncombustible particulate may be obtained with such a coating, or such a coating can be applied to the particulate prior to combining with the polymer.

The blocks included in the above described process are for illustration purposes. The methods may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

FIG. 6 is a block diagram of an automated machine 600 that may be used for making an example flame retardant composition and/or flame retardant polymer composition as described herein using the process steps outlined in FIG. 5A and FIG. 5B, in accordance with at least some embodiments. As illustrated in FIG. 6, a manufacturing controller 690 may be coupled to machines that can be used to carry out the steps described in FIG. 6, for example, a mixer/reactor/adsorber chamber 620, a particulate source 622, an optional source 623 of polymer or monomer, a source 624 of fluid that contains phosphorus, optional heater/light source 626, optional source 628 of solvent for dissolving phosphorus or polymer, and/or optional coating/film forming machine 630. Manufacturing controller 690 may be operated by human control, or may be directed by a remote controller 670 via network 610. Data associated with controlling the different processes of making the dielectric material may be stored at and/or received from data stores 680.

Figure 7:
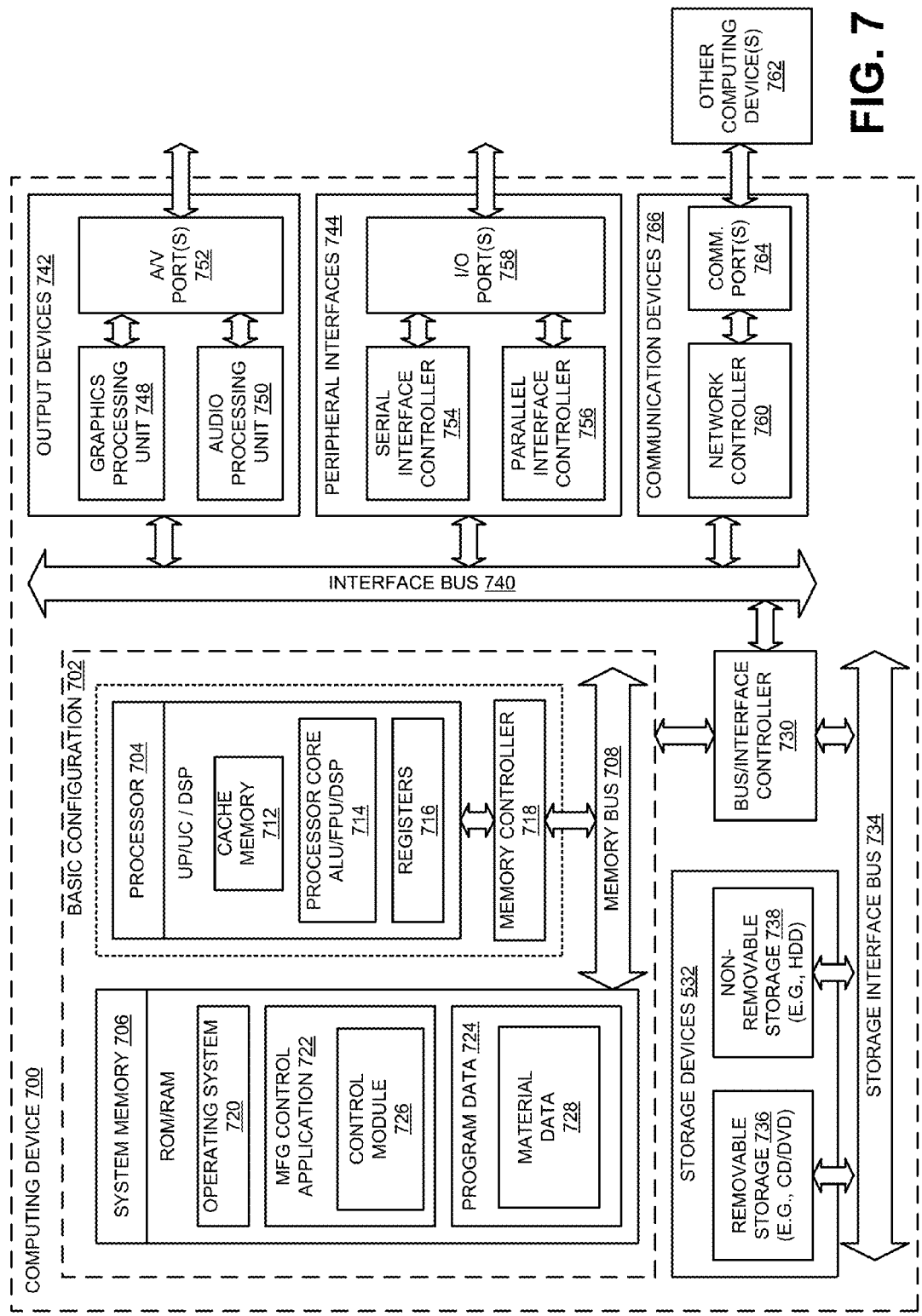
FIG. 7 illustrates a general purpose computing device that may be used to control the automated machine of FIG. 6 in making the flame retardant compositions and flame retardant polymer compositions.

FIG. 7 illustrates a general purpose computing device 700, which may be used to implement the methods of making flame retardant compositions and flame retardant polymer compositions, in accordance with at least some embodiments described herein. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, a processor core 714, and registers 716. The example processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, one or more manufacturing control applications 722, and program data 724. The game service applications 722 may include a control module 725. The program data 724 may include, among other data, one or more control parameters such as material data 728 associated with the flame retardant compositions and flame retardant polymer compositions, or the like, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more AN ports 752. One or more example peripheral interfaces 744 may include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include, for example, the manufacturing controller 690.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

FIG. 8A illustrates a block diagram of an example computer program product 800, arranged in accordance with at least some embodiments described herein. In some examples, as shown in FIG. 8A, the computer program product 800 may include a signal bearing medium 802 that may also include one or more machine readable instructions 804 that, when executed by, for example, a processor, may provide the functionality described herein. Thus, for example, referring to the processor 704 in FIG. 7, the data monitoring module 726 may undertake one or more of the tasks shown in FIG. 8A in response to the instructions 804 conveyed to the processor 704 by the medium 802 to perform actions associated with making the flame retardant composition as described herein. Some of those instructions may include, for example, one or more instructions for "providing a noncombustible particulate that includes nanoscale pores"; "providing a fluid that includes phosphorus; "contacting the fluid that includes phosphorus to the noncombustible particulate"; "adsorbing the phosphorus from the fluid into the nanoscale pores of the noncombustible particulate to produce the flame retardant composition comprising red phosphorus adsorbed by the noncombustible particulate"; "melting phosphorus to form the fluid as molten phosphorus"; "adsorbing the molten phosphorus into the nanoscale pores of the noncombustible particulate"; "providing the fluid as a solution"; "adsorbing dissolved phosphorus from the solution of phosphorus into the nanoscale pores of the noncombustible particulate"; "removing the solvent to form the flame retardant composition"; and the like, according to embodiments described herein.

FIG. 8B illustrates additional instructions 805 which may be conveyed to the processor 704 by the medium 802 to perform actions associated with making the flame retardant polymer composition as described herein. Some of those instructions may include, for example, one or more instructions for "providing a polymer"; "providing a flame retardant that includes a noncombustible particulate that includes nanoscale pores; and red phosphorus adsorbed into the nanoscale pores of the noncombustible particulate"; "contacting the polymer and the flame retardant to form the polymer composition"; "providing an organic solvent solution of the polymer; and contacting the organic solvent solution of the polymer and the flame retardant and removing the organic solvent to form the polymer composition"; "providing a monomer of the polymer; contacting the monomer and the flame retardant; and polymerizing the monomer to form the polymer in contact with the flame retardant"; "providing the polymer in molten form; mixing the polymer in molten form with the flame retardant; and cooling the polymer in molten form with the flame retardant to form the flame retardant polymer composition"; "forming the polymer as a film that includes the flame retardant"; and the like, according to embodiments described herein.

In some implementations, the signal bearing medium 802 depicted in FIG. 8A and FIG. 8B may encompass a computer-readable medium 806, such as, but not limited to, a hard disk drive, a solid state drive, a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the program product 800 may be conveyed to one or more modules of the processor 804 by an RF signal bearing medium, where the signal bearing medium 802 is conveyed by the wireless communications medium 810 (e.g., a wireless communications medium conforming with the IEEE 802.11 standard).

According to some examples, a flame retardant composition is provided. The flame retardant composition may include a noncombustible particulate that includes nanoscale pores; and red phosphorus adsorbed into the nanoscale pores of the noncombustible particulate.

In various examples, the flame retardant composition may be characterized by a total red phosphorus content substantially comprising the adsorbed red phosphorus. In some examples, the flame retardant composition may be characterized by a total adsorbed phosphorus content substantially comprising the red phosphorus. In other examples of the flame retardant composition, the red phosphorous may be present in the flame retardant composition at about 30% to about 90% by weight.

In various examples of the flame retardant composition, the noncombustible particulate includes one or more of silica gel, alumina, a zeolite, and/or an aerogel. In some examples, the noncombustible particulate may be characterized by an average particle diameter of about 0.1 micrometers to about 100 micrometers. In other examples, the noncombustible particulate may be characterized by an average nanoscale pore diameter of about 0.001 micrometers to about 10 micrometers. In further examples, the noncombustible particulate may be characterized by a surface area by weight of about 20 square meters per gram to about 2,000 square meters per gram.

In some examples of the flame retardant composition, a water reactivity of the red phosphorus adsorbed by the noncombustible particulate may be less than a water reactivity of a pure red phosphorus particulate, the pure red phosphorus particulate having an average particle diameter of 100 micrometers.

According to other examples, a flame retardant polymer composition may include at least one polymer; and a flame retardant composition dispersed in the polymer. The flame retardant composition may include a noncombustible particulate that includes nanoscale pores; and red phosphorus adsorbed into the nanoscale pores of the noncombustible particulate.

In various examples, the flame retardant polymer composition may be configured as a film. The flame retardant polymer composition may be characterized by an average film thickness of equal to or less than about 100 micrometers.

In various examples of the flame retardant polymer composition, the polymer may include one or more of a polyolefin, a polyalkylene, a polyoxyalkylene, a polyvinylene, a polyarylene, a polyheteroarylene, a polyester, a polyalkylene terephthalate, a polyacrylonitrile, a polyacrylate, a polystyrene, a poly acrylonitrile-butadiene-polystyrene, a polycarbonate, a polyether, a polyurethane, an epoxy, mixtures thereof, and copolymers thereof.

In various examples of the flame retardant polymer composition, the noncombustible particulate may be characterized by an average particle diameter that is less than a thickness of the film. In some examples, the noncombustible particulate may include one or more of silica gel, alumina, a zeolite, and/or an aerogel. In other examples, the noncombustible particulate may be characterized by an average particle diameter of about 0.1 micrometers to about 100 micrometers. In further examples, the noncombustible particulate may be characterized by an average nanoscale pore diameter of about 0.001 micrometers to about 10 micrometers. In various examples of the flame retardant polymer composition, the noncombustible particulate may be characterized by a surface area by weight of about 20 square meters per gram to about 2,000 square meters per gram.

In some examples of the flame retardant polymer composition, the red phosphorus adsorbed by the noncombustible particulate may be about 0.1% by weight to about 20% by weight of the polymer composition. In other examples, the flame retardant polymer composition may be characterized by a total red phosphorus content substantially comprising the adsorbed red phosphorus. In further examples, the flame retardant polymer composition may be characterized by a total adsorbed phosphorus content substantially comprising the red phosphorus. In various examples of the flame retardant polymer composition, the red phosphorous may be present in the flame retardant composition at about 30% to about 90% by weight.

According to further examples, a method of making a flame retardant composition may include: providing a noncombustible particulate that includes nanoscale pores; providing a fluid that includes phosphorus; contacting the fluid and the noncombustible particulate; and adsorbing the phosphorus from the fluid into the nanoscale pores of the noncombustible particulate to produce the flame retardant composition comprising solid red phosphorus adsorbed by the noncombustible particulate.

In various examples of the method of making the flame retardant composition, providing the fluid that includes phosphorus may include heating white phosphorus to a temperature greater than about 44° C. to form the fluid as molten white phosphorus. In various examples of the method of making the flame retardant composition, adsorbing the phosphorus from the fluid may include adsorbing the molten white phosphorus into the nanoscale pores of the noncombustible particulate.

In some examples of the method of making the flame retardant composition, providing the fluid that includes phosphorus may include providing a solution of phosphorus in: carbon disulfide, liquid ammonia, liquid sulfur dioxide, liquid carbon dioxide, phosphorus tribromide, phosphorus trichloride, an organic solvent, or a mixture thereof. In various examples of the method of making the flame retardant composition, adsorbing the phosphorus from the fluid may include adsorbing dissolved phosphorus from the solution of phosphorus into the nanoscale pores of the noncombustible particulate and removing the solvent to form the flame retardant composition.

In other examples of the method of making the flame retardant composition, wherein the phosphorus is adsorbed from the fluid as white phosphorus, the method may further include forming the solid red phosphorus in the nanoscale pores of the noncombustible particulate from the white phosphorus by: heating the white phosphorus to a temperature greater than about 250° C.; heating the white phosphorus to a temperature greater than about 170° C. in the presence of phosphorus trichloride, phosphorus tribromide, phosphorus triiodide, bromine, or iodine; or exposing the white phosphorus to light.

In further examples of the method of making the flame retardant composition, providing the fluid phosphorus may further include heating red phosphorus to a temperature greater than about 579° C. to form the fluid phosphorus as molten red phosphorus.

In various examples, the method of making the flame retardant composition may further include calcining the noncombustible particulate before contacting the fluid phosphorus and the noncombustible particulate.

In various examples, the method of making the flame retardant composition may further include separating unadsorbed phosphorus from the flame retardant composition after adsorbing the phosphorus into the nanoscale pores of the noncombustible particulate. In some examples, the method of making the flame retardant composition may further include separating white phosphorus from the flame retardant composition after adsorbing the phosphorus into the nanoscale pores of the noncombustible particulate.

In various examples of the method of making the flame retardant composition, the flame retardant composition may be characterized by a total red phosphorus content substantially comprising the adsorbed red phosphorus. In some examples, the flame retardant composition may be characterized by a total adsorbed phosphorus substantially comprising the red phosphorus. In other examples, the flame retardant composition may be characterized by a red phosphorus percentage of the flame retardant composition of about 30% to about 90% by weight.

In various examples of the method of making the flame retardant composition, the noncombustible particulate may include one or more of silica gel, alumina, a zeolite, and/or an aerogel. In some examples, the noncombustible particulate may be characterized by an average particle diameter of about 0.1 micrometers to about 100 micrometers. In other examples, the noncombustible particulate may be characterized by an average nanoscale pore diameter of about 0.001 micrometers to about 10 micrometers. In further examples, the noncombustible particulate may be characterized by a surface area by weight of about 20 square meters per gram to about 2,000 square meters per gram.

According to yet other examples, a method of making a flame retardant polymer composition may include: providing a polymer; providing a flame retardant that includes a noncombustible particulate that includes nanoscale pores, and red phosphorus adsorbed into the nanoscale pores of the noncombustible particulate; and contacting the polymer and the flame retardant to form the polymer composition.

In various examples of the method of making the flame retardant polymer composition, providing the polymer may include providing an organic solvent solution of the polymer; and contacting the polymer and the flame retardant to form the polymer composition may include contacting the organic solvent solution of the polymer and the flame retardant and removing the organic solvent to form the polymer composition.

In some examples of the method of making the flame retardant polymer composition, providing the polymer may include providing a monomer of the polymer; contacting the monomer and the flame retardant; and polymerizing the monomer to form the polymer in contact with the flame retardant.

In other examples of the method of making the flame retardant polymer composition, providing the polymer may include providing the polymer in molten form; mixing the polymer in molten form with the flame retardant; and cooling the polymer in molten form with the flame retardant to form the flame retardant polymer composition.

In further examples of the method of making the flame retardant polymer composition, contacting the polymer and the flame retardant to form the polymer composition may further include forming the polymer as a film that includes the flame retardant. The film may be characterized by an average film thickness of equal to or less than about 100 micrometers.

In various examples of the method of making the flame retardant polymer composition, the noncombustible particulate may be characterized by an average particle diameter that is less than a thickness of the film of the polymer. In some examples, the noncombustible particulate may include one or more of silica gel, alumina, a zeolite, and/or an aerogel. In other examples, the noncombustible particulate may be characterized by an average particle diameter of about 0.1 micrometers to about 100 micrometers. In further examples, the noncombustible particulate may be characterized by an average nanoscale pore diameter of about 0.001 micrometers to about 10 micrometers. In various examples, the noncombustible particulate may be characterized by a surface area by weight of about 20 square meters per gram to about 2,000 square meters per gram.

In various examples of the method of making the flame retardant polymer composition, the polymer may include one or more of a polyolefin, a polyalkylene, a polyoxyalkylene, a polyvinylene, a polyarylene, a polyheteroarylene, a polyester, a polyalkylene terephthalate, a polyacrylonitrile, a polyacrylate, a polystyrene, a poly acrylonitrile-butadiene-polystyrene, a polycarbonate, a polyether, a polyurethane, an epoxy, mixtures thereof, and copolymers thereof.

In various examples of the method of making the flame retardant polymer composition, the flame retardant may be characterized by a total red phosphorus content substantially comprising the adsorbed red phosphorus. In some examples, the flame retardant may be characterized by a total adsorbed phosphorus content substantially comprising the red phosphorus. In other examples of the method of making the flame retardant polymer composition, the flame retardant may be characterized by a red phosphorus percentage of the flame retardant composition of about 30% to about 90% by weight.

According to some examples, a computer-readable storage medium may have instructions stored thereon for making a flame retardant composition. The instructions may include: providing a noncombustible particulate that includes nanoscale pores; providing a fluid that includes phosphorus; contacting the fluid that includes phosphorus and the noncombustible particulate; and adsorbing the phosphorus from the fluid into the nanoscale pores of the noncombustible particulate to produce the flame retardant composition comprising red phosphorus adsorbed by the noncombustible particulate.

In various examples, the computer-readable storage medium may further include instructions for: melting phosphorus to form the fluid as molten phosphorus; and adsorbing the molten phosphorus into the nanoscale pores of the noncombustible particulate.

In some examples, the computer-readable storage medium may further include instructions for: providing the fluid as a solution of phosphorus in: carbon disulfide, liquid ammonia, liquid sulfur dioxide, liquid carbon dioxide, phosphorus tribromide, phosphorus trichloride, an organic solvent, or a mixture thereof; adsorbing dissolved phosphorus from the solution of phosphorus into the nanoscale pores of the noncombustible particulate; and removing the solvent to form the flame retardant composition.

In other examples, wherein the phosphorus is adsorbed from the fluid as white phosphorus, the computer-readable storage medium may further include instructions for: forming the solid red phosphorus in the nanoscale pores of the noncombustible particulate from the white phosphorus by: heating the white phosphorus to a temperature greater than about 250° C.; heating the white phosphorus to a temperature greater than about 170° C. in the presence of phosphorus trichloride, phosphorus tribromide, phosphorus triiodide, bromine, or iodine; or exposing the white phosphorus to light.

According to other examples, a system for preparing a flame retardant composition may include: a mixing chamber configured to mix solids and liquids; a phosphorus source; a particulate source; a heater; and a solvent source.

In various examples, the system for preparing a flame retardant composition may include: a programmable controller coupled to the mixing chamber, the phosphorus source, the particulate source, the heater, and the solvent source, wherein the controller is programmed with one or more instructions. The instructions may include: employing the particulate source to provide a noncombustible particulate that includes nanoscale pores to the mixing chamber; employing the phosphorus source to provide a fluid that includes phosphorus, wherein the fluid is molten phosphorus or a solution of phosphorus in: carbon disulfide, liquid ammonia, liquid sulfur dioxide, liquid carbon dioxide, phosphorus tribromide, phosphorus trichloride, an organic solvent, or a mixture thereof; employing the mixing chamber to contact the fluid that includes phosphorus to the noncombustible particulate; and employing the mixing chamber to adsorb phosphorus from the fluid into the nanoscale pores of the noncombustible particulate; and/or wherein the phosphorus is adsorbed from the fluid as white phosphorus, forming the solid red phosphorus in the nanoscale pores of the noncombustible particulate from the white phosphorus by: heating the white phosphorus to a temperature greater than about 250° C.; heating the white phosphorus to a temperature greater than about 170° C. in the presence of phosphorus trichloride, phosphorus tribromide, phosphorus triiodide, bromine, or iodine; or exposing the white phosphorus to light.

EXAMPLES

Example 1A

Preparation of an example silica noncombustible particulate that includes nanoscale pores: Silica gel may be procured having the following characteristics: particle diameter about 35-75 micrometers (220-440 mesh); nanopore diameter, about 60 angstroms; nanopore volume, about 0.8 cubic centimeters per gram; surface area, about 500 square meters per gram (Sigma-Aldrich, St. Louis Mo.). The silica gel may be heated to 200° C. in a rotary kiln for 10 minutes to remove adsorbed water, and may be allowed to cool to produce dried silica gel for use in the following examples.

Example 1B

Preparation of an example alumina noncombustible particulate that includes nanoscale pores: Alumina may be procured having the following characteristics: particle diameter about 50-75 micrometers (220-290 mesh); surface area, about 200 square meters per gram (Sigma-Aldrich, St. Louis Mo.). The alumina may be heated to 200° C. in a rotary kiln for 10 minutes to remove adsorbed water, and may be allowed to cool to produce dried alumina for use in the following examples.

Example 1C

Adsorption of white phosphorus and conversion to red phosphorus in silica: A 1 gram portion of the dried silica gel may be combined in a ceramic crucible with 1 gram of white phosphorus and may be heated to 50° C. The silica gel and resulting molten white phosphorus may be stirred together with a ceramic rod, and the mixture may be heated to 300° C. for 1 hour. The mixture may be cooled to room temperature, stirred for about 10 min with 25 milliliters of carbon disulfide at about 45° C., filtered, and washed with 3×20 milliliters of boiling carbon disulfide. The mixture may be removed from the filter and remaining solvent may be removed under vacuum to give a dry powder which may then be passed through a 220 mesh screen to remove any large particles of unadsorbed red phosphorus. The result may be 1.9 g of dry powdered silica flame retardant composition. The silica flame retardant composition may be analyzed and may be found to have the following characteristics: percent by weight of red phosphorus, 47.4%; percent by weight of white phosphorus, <0.1%; percent by weight of red phosphorus adsorbed in the silica gel, >99%; particle diameter about 35-75 micrometers (220-440 mesh).

Example 1D

Solvent deposition of white phosphorus and conversion to red phosphorus in silica: A 1 gram portion of the dried silica gel may be combined with a solution of 1 gram of white phosphorus in carbon disulfide and treated under vacuum in a rotary evaporator to remove the solvent. The resulting dry powder, including white phosphorus adsorbed onto the silica, may be heated to 300° C. for 1 hour in a ceramic crucible. The mixture may be cooled to room temperature, stirred for about 10 min with 25 milliliters of carbon disulfide at about 45° C., filtered, and washed with 3×20 milliliters of boiling carbon disulfide. The mixture may be removed from the filter and remaining solvent may be removed under vacuum to give a dry powder which may then be passed through a 220 mesh screen to remove any large particles of unadsorbed red phosphorus. The result may be 1.9 g of dry powdered silica flame retardant composition. The silica flame retardant composition may be analyzed and may be found to have the following characteristics: percent by weight of red phosphorus, 47.4%; percent by weight of white phosphorus, <0.1%; percent by weight of red phosphorus adsorbed in the silica gel, >99%; particle diameter about 35-75 micrometers (220-440 mesh).

Example 1E

Adsorption of red phosphorus into silica: A 1 gram portion of the dried silica gel may be combined with 2 grams of red phosphorus in a ceramic crucible, stirred with a ceramic rod, and heated to 580° C. for 1 hour. The mixture may be cooled to room temperature and the resulting powder may then be passed through a 220 mesh screen to remove any large particles of unadsorbed red phosphorus. The result may be 2.9 g of dry powdered silica flame retardant composition. The silica flame retardant composition may be analyzed and may be found to have the following characteristics: percent by weight of red phosphorus, 65.5%; percent by weight of white phosphorus, <0.1%; percent by weight of red phosphorus adsorbed in the silica gel, >99%; particle diameter about 35-75 micrometers (220-440 mesh).

Example 1F

Adsorption of white phosphorus and conversion to red phosphorus in alumina. A 1 gram portion of the dried alumina may be combined in a ceramic crucible with 0.5 gram of white phosphorus and 10 milligrams of crystalline iodine and may be heated to 50° C. The resulting mixture of molten white phosphorus, iodine, and alumina may be stirred together with a ceramic rod, and the mixture may be heated to 175° C. for 1 hour. The mixture may be cooled to room temperature, stirred for about 10 min with 25 milliliters of carbon disulfide at about 45° C., filtered, and washed with 3×20 milliliters of boiling carbon disulfide. The mixture may be removed from the filter and remaining solvent may be removed under vacuum to give a dry powder which may then be passed through a 220 mesh screen to remove any large particles of unadsorbed red phosphorus. The result may be 1.45 g of dry powdered alumina flame retardant composition. The alumina flame retardant composition may be analyzed and may be found to have the following characteristics: percent by weight of red phosphorus, 31.0%; percent by weight of white phosphorus, <0.1%; percent by weight of red phosphorus adsorbed in the alumina, >99%; particle diameter about 50-75 micrometers (220-290 mesh).

Example 1G

Lower water reactivity of red phosphorus in silica flame retardant composition: A 0.01 gram portion of red phosphorus as 100 micrometer particles, and a 0.0153 gram portion of the flame retardant composition produced in Example 1E may each be stirred separately at 10° C. in 50 milliliters of pure, pH 7 water. The pH of each mixture may be monitored and the production of phosphine gas above each mixture may be monitored by gas chromatography. A reaction rate may be determined between the water and the red phosphorus in each mixture from the rate of increase in pH and/or the rate of phosphine gas production. Under the same conditions, the reaction rate of water with red phosphorus adsorbed on the silica in the flame retardant composition may be found to be substantially less than the reaction rate of water with red phosphorus as 100 micrometer particles.

Example 2A

Preparation of a polymer composition comprising the flame retardant composition via solvent mixing. A sample of 0.5 gram of the silica flame retardant composition of Example 1C may be combined with a solution of dry tetrahydrofuran saturated with 9.5 grams of dissolved polystyrene at 30° C. The mixture may be stirred, cooled to 25° C., and may then be applied to a polystyrene substrate via spin coating to result in a flame retardant polymer composition film about 100 micrometers thick. A substantial portion of the flame retardant particles in the flame retardant polymer composition film may be found at or below the surface of the film, whereby the surface of the film may be smooth.

Example 2B

Preparation of a polymer composition comprising the flame retardant composition via molten polymer mixing. A sample of 0.5 gram of the silica flame retardant composition of Example 1C may be combined with 9.5 grams of molten polystyrene at 200° C. in an inert atmosphere. The mixture may be stirred thoroughly, then injected into a mold and cooled to form a solid polystyrene article that includes the flame retardant composition.

Example 2C

Preparation of a polymer composition comprising the flame retardant composition via polymerization. A sample of 0.5 gram of the silica flame retardant composition of Example 1C may be combined with 9.5 grams of liquid epoxy. The mixture may be stirred thoroughly and the liquid epoxy may be applied to pot a resistor. The liquid epoxy may then be contacted with a corresponding hardener, whereby the liquid epoxy polymerizes in the presence of the silica flame retardant composition. The result may be that the resistor may be potted in a solid epoxy polymer composition that includes the silica flame retardant composition.

Example 3A

Flame testing of article that includes the flame retardant composition. Two polymer coupons may be prepared for flame testing, a first coupon including the polystyrene substrate having the flame retardant polymer composition film of Example 2A, and a second coupon prepared in an identical manner to the first coupon but lacking the flame retardant composition. The first and second coupons may be exposed to a gas burner flame under identical conditions. The second coupon may begin to burn within a few seconds. The flame retardant polymer composition film at the first coupon may blacken, and may form a char layer, but the underlying coupon may display substantially less thermal damage compared to the first coupon.

Example 3B

Flame testing of article that includes the flame retardant composition. Two polymer coupons may be prepared for flame testing, a first coupon being the solid, injection molded polystyrene article that includes the flame retardant composition prepared in Example 2B, and a second coupon being prepared in an identical manner to the first coupon but lacking the flame retardant composition. The first and second coupons may be exposed to a gas burner flame under identical conditions. The second coupon may begin to burn within a few seconds. The flame retardant polymer composition film at the first coupon may blacken, forming a char layer, but the underlying coupon may display substantially less thermal damage compared to the first coupon.

Example 3C

Flame testing of article that includes the flame retardant composition. Two epoxy-potted resistors may be prepared for flame testing, a first potted resistor being the resistor potted in a solid epoxy polymer composition that includes the silica flame retardant composition as prepared in Example 2C, and a second potted resistor prepared in an identical manner to the first resistor but lacking the flame retardant composition. The first and second potted resistors may each be contacted with an electrical current sufficient to heat the resistors to the point where the epoxy potting of the second resistor may begin to burn with an open flame. The flame retardant epoxy polymer composition which pots the first resistor may exhibit some charring, but may not support an open flame.

The terms "a" and "an" as used herein mean "one or more" unless the singular is expressly specified. Thus, for example, reference to "a base" includes a mixture of two or more bases, as well as a single base.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to, plus or minus 10% of the particular term.

The terms "optional" and "optionally" mean that the subsequently described circumstance may or may not occur, so that the description includes instances where the circumstance occurs and instances where it does not.

Alkyl groups include straight chain and branched chain alkyl groups having from 1 to 12 carbon atoms, and typically from 1 to 10 carbons or, in some examples, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above and include, without limitation, haloalkyl (e.g., trifluoromethyl), hydroxyalkyl, thioalkyl, aminoalkyl, alkylaminoalkyl, dialkylaminoalkyl, alkoxyalkyl, carboxyalkyl, and the like.

In various examples, the noncombustible particulate may include an organic surface layer, e.g., an organic surface monolayer or an organic surface multilayer. In various examples, the organic surface layer may include an alkyl phosphonate, an alkyl carboxylate, an alkylsiloxane, or a crosslinking agent. In some examples, the organic surface layer may be an n-octyl phosphonic acid layer. In further examples, the organic surface layer may be a vinyl silane crosslinking agent. Such organic surface layers are well-known and are commonly used to increase chemical compatibility, miscibility, etc. when mixed into organic polymers, compared to particles without organic surface layers. In some examples, the method includes applying an organic surface layer the noncombustible particulate. Typically, organic surface layers may be formed by a condensation reaction between OH groups on the layer-forming group and the surface. For example, an alkyl carboxylate, alkyl-C(=O)—OH, can be reacted, optionally via acidic or basic catalysis, with a free HO—Si group on the surface of a silica particle to release $H_2O$ and form alkyl-C(=O)—O—Si-(particle). Similarly, alkyl phosphonates and alkyl siloxanes can be reacted with free OH groups on the particle surfaces to form corresponding organic surface layers. In other examples, in the case of a crosslinking agent such as vinyl silane, the silane portion may be coupled to the particle surfaces, e.g., by a condensation reaction to form a vinyl-Si—O— group bonded to the nanoparticle surface.

The terms "alkyl phosphonate", "alkyl carboxylate", and "alkyl siloxane" refer to the corresponding groups bonded to an alkyl group, e.g., alkyl-P(=O)(OH)$_2$, alkyl-C(=O)OH, etc. In the context of an organic surface layer, the terms "alkyl phosphonate", "alkyl carboxylate", "alkyl siloxane" and "crosslinking agent" (e.g., a "vinyl silane") refer to these groups where available OH groups may be bonded to complementary surface groups, e.g., a silicon atom or other reactive site on the particles so modified. For example, an alkyl carboxylate organic surface layer on a silicon dioxide particle may be represented in part by alkyl-C(=O)—O—Si-particle.

The term "halogen" or "halo," as used herein, refers to bromine, chlorine, fluorine, or iodine. In some examples, the halogen can be fluorine. In other examples, the halogen can be chlorine or bromine.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical manufacturing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A flame retardant composition comprising:
 a noncombustible particulate dispersed in a polymer film, the noncombustible particulate including nanoscale pores; and
 red phosphorus adsorbed into the nanoscale pores of the noncombustible particulate, wherein the flame retardant composition is characterized by a total red phosphorus content substantially comprising the adsorbed red phosphorus.

2. The composition of claim 1, wherein the red phosphorous is present in the composition at about 30% to about 90% by weight.

3. The composition of claim 1, wherein the noncombustible particulate includes one or more of silica gel, alumina, a zeolite, and an aerogel.

4. The composition of claim 1, wherein the noncombustible particulate is characterized by an average particle diameter of about 0.1 micrometers to about 100 micrometers.

5. The composition of claim 1, wherein the noncombustible particulate is characterized by an average nanoscale pore diameter of about 0.001 micrometers to about 10 micrometers.

6. The composition of claim 1, wherein the noncombustible particulate is characterized by a surface area by weight of about 20 square meters per gram to about 2,000 square meters per gram.

7. The composition of claim 1, wherein a water reactivity of the red phosphorus adsorbed by the noncombustible particulate is less than a water reactivity of a pure red phosphorus particulate, the pure red phosphorus particulate having an average particle diameter of 100 micrometers.

8. A polymer composition comprising:
 at least one polymer configured as a film; and
 a flame retardant composition dispersed in the polymer, the flame retardant composition including:
  a noncombustible particulate that includes nanoscale pores; and
  red phosphorus adsorbed into the nanoscale pores of the noncombustible particulate, wherein the flame retardant composition is characterized by a total red phosphorus content substantially comprising the adsorbed red phosphorus.

9. The polymer composition of claim 8, characterized by an average film thickness of equal to or less than about 100 micrometers.

10. The polymer composition of claim 8, wherein the noncombustible particulate is characterized by an average particle diameter that is less than a thickness of the film.

11. The polymer composition of claim 8, wherein the red phosphorus adsorbed by the noncombustible particulate is about 0.1% by weight to about 20% by weight of the polymer composition.

12. The polymer composition of claim 8, wherein the polymer includes one or more of a polyolefin, a polyalkylene, a polyoxyalkylene, a polyvinylene, a polyarylene, a polyheteroarylene, a polyester, a polyalkylene terephthalate, a polyacrylonitrile, a polyacrylate, a polystyrene, a poly acrylonitrile-butadiene polystyrene, a polycarbonate, a polyether, a polyurethane, an epoxy, mixtures thereof, and copolymers thereof 13. A method of making a flame retardant composition, the method comprising:
 providing a noncombustible particulate that includes nanoscale pores;
 providing a fluid that includes phosphorus;
 contacting the fluid and the noncombustible particulate;
 adsorbing the phosphorus from the fluid into the nanoscale pores of the noncombustible particulate to produce the flame retardant composition comprising solid red phosphorus adsorbed by the noncombustible particulate; and
 separating unadsorbed phosphorus from the flame retardant composition after adsorbing the phosphorus into the nanoscale pores of the noncombustible particulate.

14. The method of claim 13, wherein:
 providing the fluid that includes phosphorus comprises heating white phosphorus to a temperature greater than about 44° C. to form the fluid as molten white phosphorus; and
 adsorbing the phosphorus from the fluid includes adsorbing the molten white phosphorus into the nanoscale pores of the noncombustible particulate.

15. The method of claim 13, wherein:
 providing the fluid that includes phosphorus comprises:
  providing a solution of phosphorus in: carbon disulfide, liquid ammonia, liquid sulfur dioxide, liquid carbon dioxide, phosphorus tribromide, phosphorus trichloride, an organic solvent, or a mixture thereof; and
  adsorbing the phosphorus from the fluid includes adsorbing dissolved phosphorus from the solution of phosphorus into the nanoscale pores of the noncombustible particulate and removing the solvent to form the flame retardant composition.

16. The method of claim 13, wherein the phosphorus is adsorbed from the fluid as white phosphorus, further comprising forming the solid red phosphorus in the nanoscale pores of the noncombustible particulate from the white phosphorus by:
 heating the white phosphorus to a temperature greater than about 250° C.; heating the white phosphorus to a temperature greater than about 170° C. in the presence of phosphorus trichloride, phosphorus tribromide, phosphorus triiodide, bromine, or iodine; orexposing the white phosphorus to light.

17. A method of making a polymer composition, the method comprising:
 providing a polymer configured as a film;
 providing a flame retardant that includes:
  a noncombustible particulate that includes nanoscale pores; and
  red phosphorus adsorbed into the nanoscale pores of the noncombustible particulate, wherein unadsorbed phosphorus is separated from the flame retardant composition after the phosphorus adsorbed into the nanoscale pores of the noncombustible particulate; and
 contacting the polymer and the flame retardant to form the polymer composition.

18. The method of claim 17, wherein:
 providing the polymer includes providing an organic solvent solution of the polymer; and
 contacting the polymer and the flame retardant to form the polymer composition includes contacting the organic solvent solution of the polymer and the flame retardant and removing the organic solvent to form the polymer composition.

19. The method of claim 17, wherein providing the polymer includes:
 providing a monomer of the polymer;
 contacting the monomer and the flame retardant; and
 polymerizing the monomer to form the polymer in contact with the flame retardant.

20. The method of claim 17, wherein providing the polymer includes:
    providing the polymer in molten form;
    mixing the polymer in molten form with the flame retardant; and
    cooling the polymer in molten form with the flame retardant to form the flame retardant polymer composition.

* * * * *

UNITED STATES PATENT AND TRADEMARK OFFICE
CERTIFICATE OF CORRECTION

PATENT NO. : 8,785,523 B2  
APPLICATION NO. : 13/604781  
DATED : July 22, 2014  
INVENTOR(S) : Miller Page 1 of 2

It is certified that error appears in the above-identified patent and that said Letters Patent is hereby corrected as shown below:

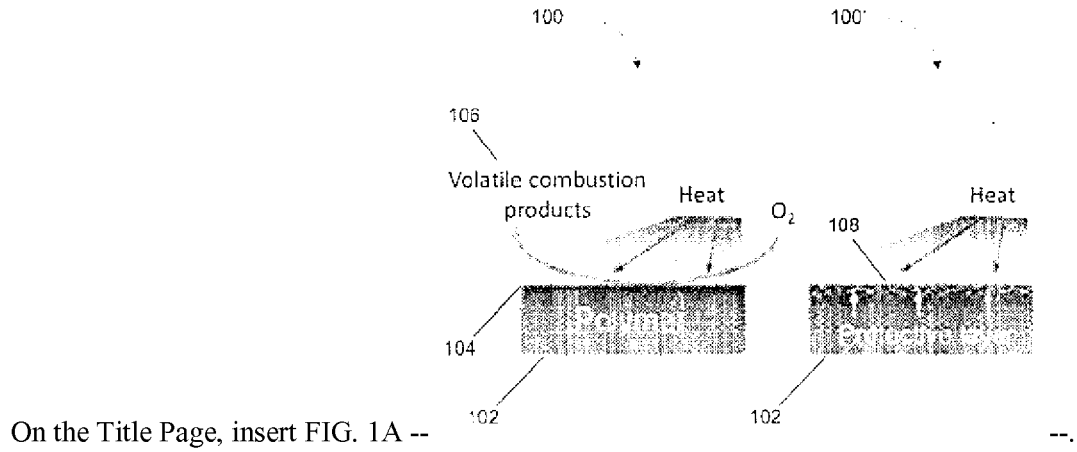

On the Title Page, insert FIG. 1A -- -- .

In the Drawings:

In Fig. 7, Sheet 10 of 12, delete Tag "766" and insert Tag -- 746 --, therefor.

In Fig. 7, Sheet 10 of 12, delete Tag "532" and insert Tag -- 732 --, therefor.

In the Specification:

In Column 11, Line 57, delete "AN" and insert -- A/V --, therefor.

In Column 19, Line 9, delete "alumina." and insert -- alumina: --, therefor.

In Column 22, Line 48, delete "and or" and insert -- and/or --, therefor.

Signed and Sealed this  
Eighteenth Day of November, 2014

Michelle K. Lee  
*Deputy Director of the United States Patent and Trademark Office*

CERTIFICATE OF CORRECTION (continued)
U.S. Pat. No. 8,785,523 B2

In the Claims:

In Column 25, Lines 58-59, in Claim 12, delete "acrylonitrile-butadiene polystyrene," and insert -- acrylonitrile-butadiene-polystyrene, --, therefor.

In Column 25, Line 61, in Claim 12, delete "thereof" and insert -- thereof. --, therefor.

In Column 26, Line 38, in Claim 16, delete "orexposing" and insert -- or exposing --, therefor.